May 14, 1963 L. P. SAUER ETAL 3,089,576
LOCATING DEVICE
Filed Dec. 16, 1960 3 Sheets-Sheet 1
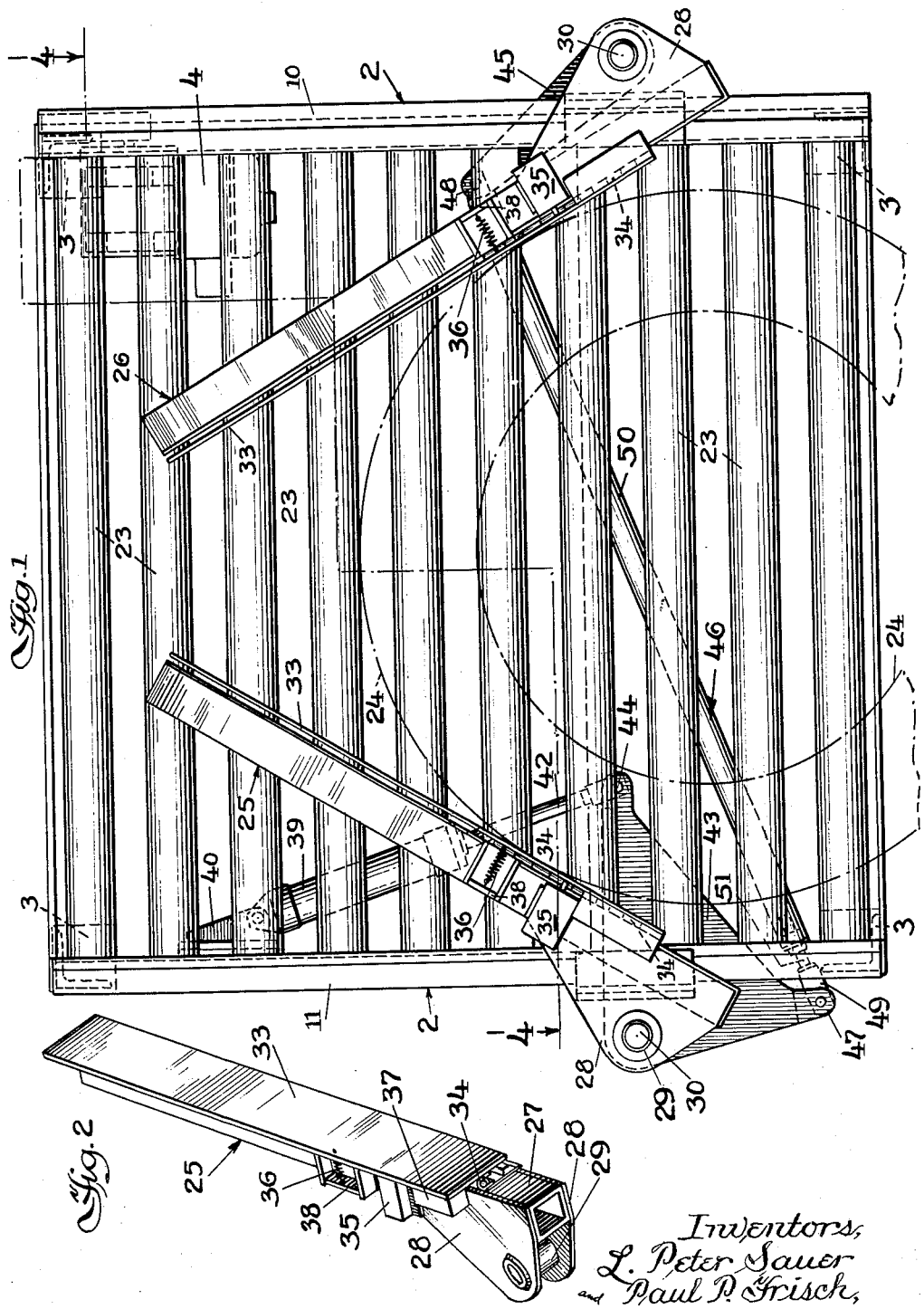
Inventors,
L. Peter Sauer
and Paul P. Frisch,
By Schneider, Dressler, Goldsmith & Clement, Attys.

May 14, 1963
L. P. SAUER ETAL
3,089,576
LOCATING DEVICE
Filed Dec. 16, 1960
3 Sheets-Sheet 2
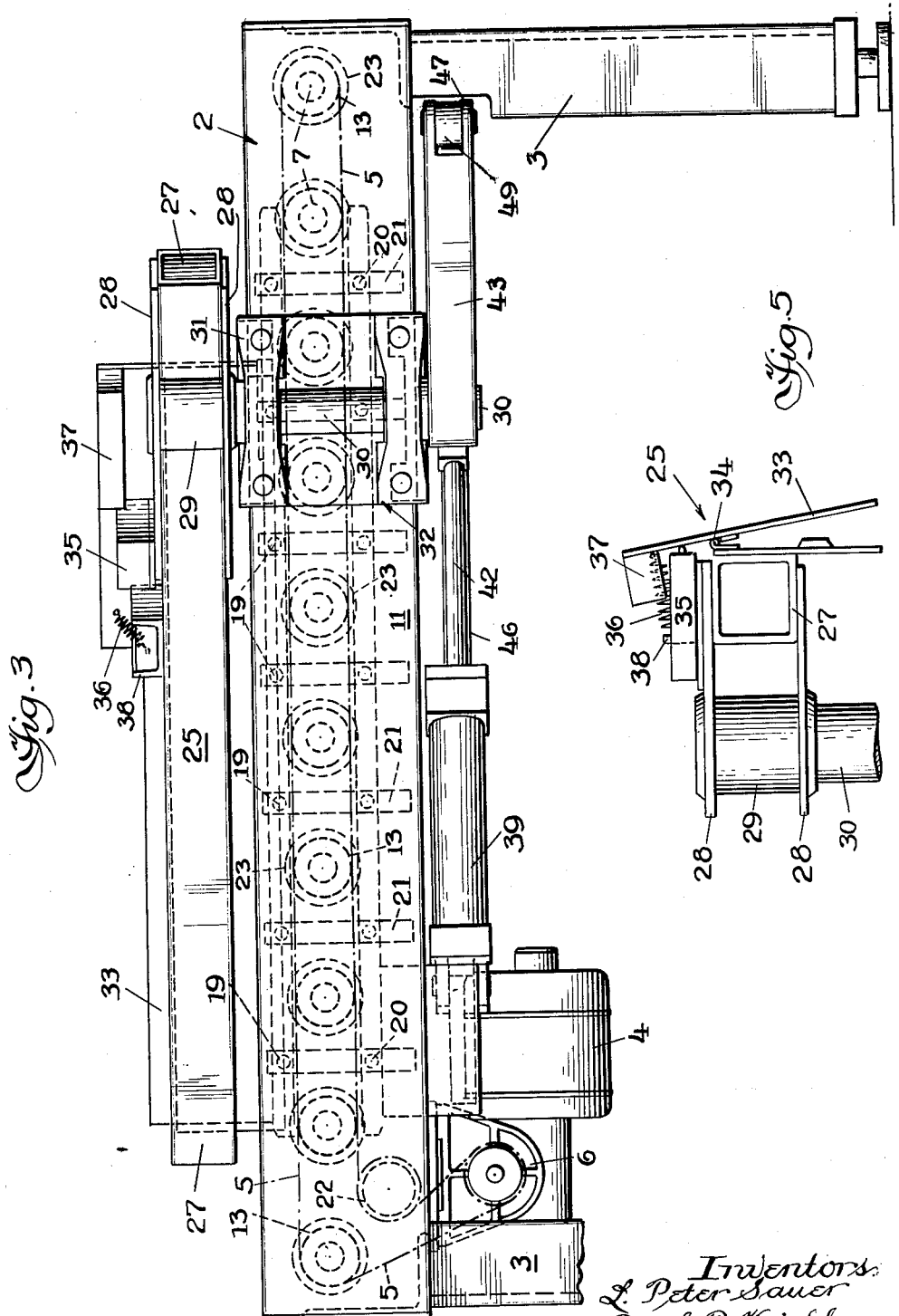
Inventors:
L. Peter Sauer
Paul P. Krisch,
By: Schneider, Dressler, Goldsmith & Clement, Attys.

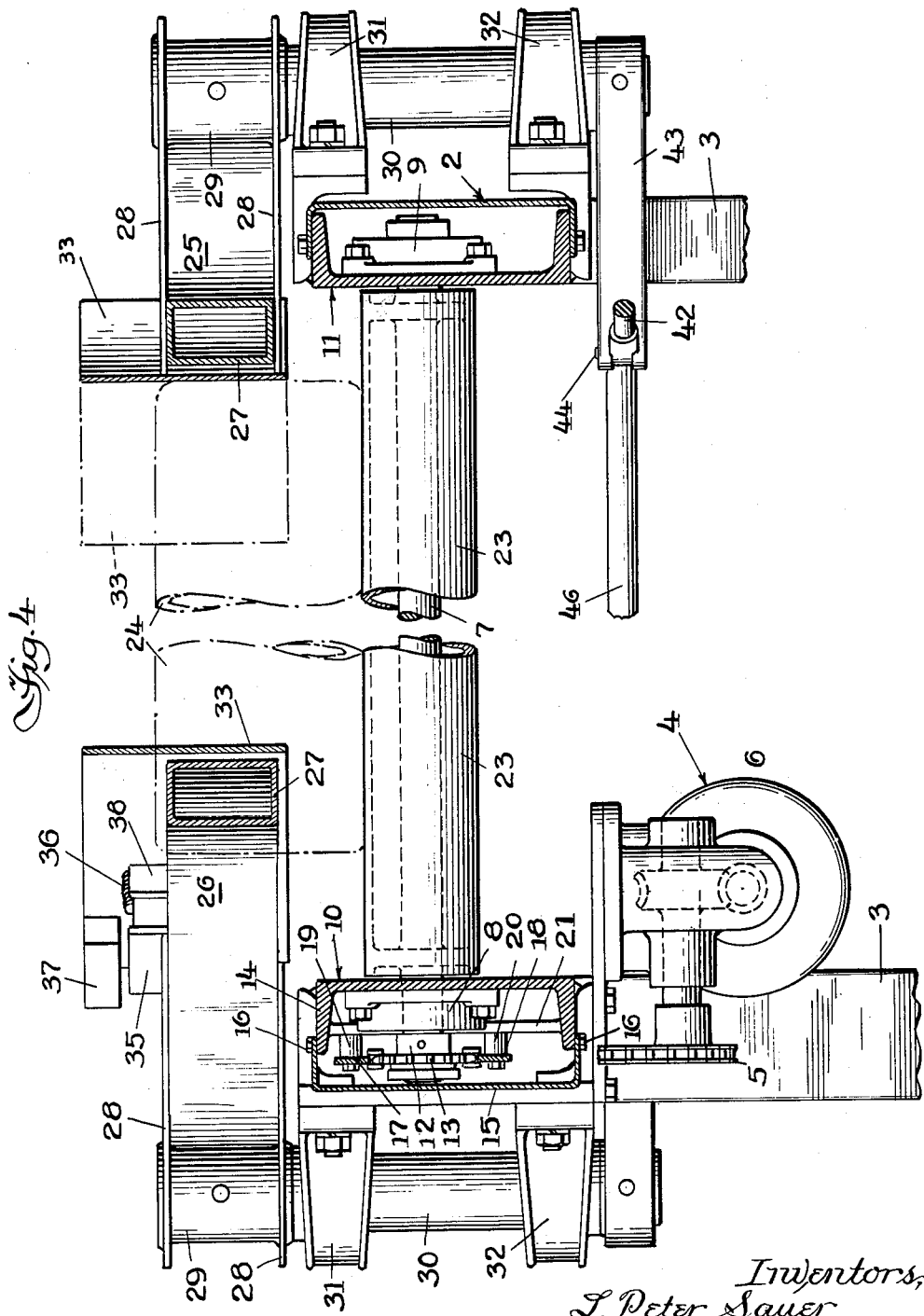

3,089,576
LOCATING DEVICE
Leo Peter Sauer, Kenosha, Wis., and Paul P. Frisch, Chicago, Ill., assignors, by direct and mesne assignments, to Signode Steel Strapping Company, Chicago, Ill., a corporation of Delaware
Filed Dec. 16, 1960, Ser. No. 76,231
9 Claims. (Cl. 198—29)

This invention relates to a conveyor for carrying an annular article, such as a coil of strap of wire lying on the conveyor and is particularly concerned with means for controlling the lateral position of the article relative to the longitudinal axis of the conveyor.

Although the present invention is of particular advantage in connection with the positioning of articles for a subsequent strapping operation, the invention is not limited to such use. The principles of the invention may be utilized to advantage whenever it is desired to position annular articles in definite, uniform spaced relationship to the longitudinal axis of a conveyor.

When a strapping machine is set up to strap articles being carried to it by a conveyor, the strapping operation may be facilitated by centering the articles to be strapped uniformly relative to the longitudinal axis of the conveyor. Fixed guide means are impractical for articles having an outer diameter that is not uniform when accurate centering of the article is required. If the fixed guides are spaced apart to allow passage of articles having a large outer diameter, they will not insure accurate centering of articles having a smaller outer diameter.

The conveyor hereinafter described as an example and illustrative embodiment of the present invention is a roller conveyor wherein a plurality of longitudinally spaced transversely disposed rolls are rotated by any suitable means to move an article longitudinally of the conveyor. However, any type of conveyor, such as a belt conveyor for example, may be used.

In this embodiment of the invention, a barrier mounted above the conveyor in the path of travel of an article being carried by the conveyor prevents passage of any article past the barrier unless it is properly positioned on the conveyor for the subsequent strapping operation. If an article is not properly positioned on the conveyor, the barrier cooperates with the conveyor to move the article into proper position, and then moves out of the way to let it pass. The article does not move laterally relative to the conveyor after it passes the barrier, and therefore remains in the desired position relative to the longitudinal axis of the conveyor.

One specific purpose of the longitudinal alignment of the articles carried by the conveyor may be to position them properly for a strapping operation. The strapping mechanism, which does not constitute any part of the present invention and therefore is not illustrated or described, is mounted in a fixed location relative to the conveyor. The uniform positioning of each article relative to the longitudinal axis of the conveyor facilitates the strapping operation because it is not necessary to thereafter position any article into cooperative engagement with the strapping mechanism.

The barrier comprises a pair of angularly disposed interconnected arms pivotally mounted adjacent opposite edges of the conveyor. The arms swing about the pivots in a plane parallel to and slightly above the conveyor intermediate the path of travel of the conveyor. Each arm has a contact sensing means, preferably in the form of a switch, and the two switches are connected in series, so that both switches must be closed in order to effect any movement in the arms. Other types of contact sensing means that may be used include air or hydraulic valves, or a mechanical or fluid linkage.

If an article moves along the conveyor in proper position it strikes both arms simultaneously, and operates both switches. The operation of both switches actuates a hydraulic cylinder that is effective to release the arms so that they may be moved pivotally outwardly by the article being moved by the conveyor. Instead of using a hydraulic cylinder, any number of other means may be used to open and close the arms. For example, an air or electric motor, or a solenoid opposing a spring or weight may be used. If the arms are opened by the article being conveyed, they may be closed by a weight or spring after the article has passed. If the structure is to be used only with articles heavy enough to open the arms, a simple mechanism, such as a mechanical latch, could be used to hold the arms closed. In such structure, the holding means may be a clutch connected to the contact sensing means through a mechanical or fluid linkage or operated by a solenoid or air, or hydraulic cylinder. The holding and releasing means may be connected to the contact sensing means in any suitable manner.

If the article being conveyed is not heavy enough to force the arms open, the operator signals the control circuit to forcibly open the arms until the article has passed.

A mechanical linkage connects both arms to move them both pivotally when either of them is moved. Instead of the mechanical linkage described, the interconnection between the arms may be provided by gears, shafts, chains, or belts, or by any combination of such devices. The rotational movement of the conveyor rolls is continuous. This movement carries the article through the opening between the free ends of the two arms when they are moved outwardly far enough to allow the articles to pass. The operator then signals the control circuit to release the arms and hold them closed.

If the article on the conveyor is not positioned properly, it will strike only one of the arms, and since the other arm is not released, neither arm will swing outwardly. The continuous rotation of the rolls of the conveyor moves the article against the angularly disposed arm with which it is in engagement. The angularity of the surface of the arm engaged by the article guides the article and causes it to move laterally relative to the longitudinal axis of the conveyor until the article engages and operates the switch of the other arm of the barrier. Both arms then swing outwardly, and the article moves through the opening between the free ends of the two arms in the same manner as the articles that are initially properly positioned on the conveyor.

If desired, the conveyor may be used with a single arm adapted to hold the articles against one side of the conveyor. A contact sensing means, such as a switch, may be provided on the side of the conveyor only, or on the arm.

Ordinarily, the arms of the barrier are arranged so that the opening between them is centered relative to the longitudinal axis of the conveyor. The structure is not limited in this respect, since the arms may be arranged so that the opening between them is positioned closer to one longitudinal edge of the conveyor than to the other. The articles do not have to be centered relative to the conveyor as long as they are spaced uniformly relative to the longitudinal axis of the conveyor. The angularly disposed surfaces of the arms engaged by the articles cooperate with the conveyor to guide each of said articles into longitudinal alignment along a line parallel to the longitudinal axis of the conveyor that extends through the intersection of the longitudinal axes of the arms of the barrier.

A structure by means of which the above and other advantages of the invention are attained is fully described in the following specification, taken in conjunction with the accompanying drawings, showing a preferred illustrative embodiment of the invention and in which:

FIGURE 1 is a top plan view of a portion of a conveyor with a pair of centering guide arms pivotally mounted on opposite edges of the conveyor;

FIGURE 2 is a detail perspective view of one of a pair of centering guide arms;

FIGURE 3 is a fragmentary side elevational view of a conveyor embodying the invention;

FIGURE 4 is a fragmentary vertical view, partly in section and partly in elevation, taken along the line 4—4 of FIGURE 1; and FIGURE 5 is a fragmentary end elevational view of the centering guide arm showing the switch closing plate mounted thereon.

The embodiment of the invention shown in the drawings includes a conveyor frame 2 which is supported in horizontal position by a plurality of legs 3. A motor 4 mounted on the frame operates an endless chain 5 through a reduction gear 6 to drive a plurality of shafts 7 extending transversely of the frame. The shafts have their ends supported in suitable bearings 8 and 9 in housings 10 and 11 and a collar 12 is secured to one end of each shaft. Each collar is provided with a gear 13 engaged by the endless chain 5 so that when the motor is operated the transverse conveyor shafts are driven.

The housing 10 comprises a channel 14 and a cover plate 15 secured thereto in any suitable manner, as, for example, by bolts 16. Chain guides 17 and 18 are mounted on supports 19 and 20, respectively, which project laterally from strips 21 that are rigidly secured to channel 14, preferably by welding. Also, an idler gear 22 is mounted adjacent the reduction gear 6 and is in engagement with the endless chain 5 to provide proper tension on the chain 5 for driving the shafts 7.

A cylindrical roll 23 is mounted on each shaft 7 and extends between housings 10 and 11. Each roll 23 is rigidly secured to its shaft 7 and rotates with it so that when the coils 24 are laid flat on the rolls 23 they are carried by said rolls into engagement with the barrier of the centering mechanism.

The barrier comprises a pair of centering guide arms 25 and 26 pivotally mounted at opposite edges of the conveyor to swing in a horizontal plane immediately above the upper surface of the rolls 23. Normally the arms 25 and 26 are angularly disposed to form a barrier to the passage of coils carried by the conveyor and to center the coils along a line parallel to the longitudinal center of the conveyor. Each arm is made of a square tube 27 having a pair of plates 28 rigidly secured to opposite surfaces thereof. The plates 28 project laterally from the outer edge of the tube 27 and are apertured to receive a tubular cylindrical sleeve 29 that is secured thereto.

The tubular sleeve 29 of each arm is rigidly secured to a vertically disposed shaft 30 that is rotatably mounted in bearings 31 and 32 projecting laterally from either housing 10 or 11. A flat plate 33 is hinged to the inner face of the square tube 27 of each centering arm, as indicated at 34. A switch 35, or other suitable contact sensing means, is mounted on the upper face of the square tube 27, and is so arranged that it is held in closed position by engagement with the upper edge portion of the flat plate 33. The centering guide arms 25 and 26 are held against pivotal movement when the switch or other contact sensing means is in closed position. A spring 36 and a counterweight 37 both urge the flat plate 33 into position against the switch 35 to hold it in closed position. The spring 36 has one end secured to the upper edge portion of the plate 33 and the other end secured to a support 38 projecting upwardly from the upper face of the square tube 27. The counterweight 37 is secured to the upper edge portion of the outer surface of the flat plate 33.

When the lower edge portion of the plate 33 is pressed toward the inner face of the square tube 27, the plate is pivotally moved about the hinge 34 against the action of spring 36 and counterweight 37. This pivotal movement of the plate 33 moves the switch 35 into open position to actuate a hydraulic cylinder 39 and thereby release the arms 25 and 26 for pivotal movement. If desired, an air cylinder or a solenoid opposing a spring or weight may be substituted for the hydraulic cylinder 39. If the arms are to be opened by the force exerted by a coil or other article carried by the conveyor, the holding means will move the arms to closed position and will hold them in said closed position until they are released. A weight or spring, without either cylinder, motor, or solenoid may be used with any simple mechanical latch when the arms are to be moved to open position by the articles carried by the conveyor. The switches 35, or other contact sensing means mounted on the arms 25 and 26 are connected in series. Accordingly, the hydraulic cylinder or other holding means is not released until both of the switches 35 are opened. The article being conveyed then engages both arms to move them pivotally until it passes through the opening. As soon as the coil or other article being conveyed passes through the opening between the arms, contact is lost and the arms are forcibly closed and held closed.

The lower edge portion of the plate 33 is moved into switch opening position by engagement with each article, such as a coil 24, as it is moved longitudinally of the conveyor. The arms 25 and 26, which are essentially duplicates, form a transverse barrier adapted to intercept each coil that is moved longitudinally by the conveyor. The cylinder 39 normally holds the arms 25 and 26 angularly disposed in closed position in a plane parallel to the conveyor slightly above the conveyor. Each coil must engage at least one of the plates 33 as it is moved toward the discharge end of the conveyor. If a coil engages only one arm, the arms will not move, and thus prevent the coil from passing the barrier. The arm engaged by the coil cooperates with the conveyor to move the coil laterally until it engages both plates 33. The coil engages both plates 33 to open both switches 35 and releases the arms for pivotal movement when the center of the coil is aligned longitudinally with the line that extends through the intersection of the axes of the arms 25 and 26, and is parallel to the longitudinal center of the conveyor.

One end of the hydraulic cylinder 39 is pivotally secured to the conveyor frame by a bracket 40 that is mounted on the frame 2. A piston rod 42 projects out of the opposite end of the hydraulic cylinder 39 and is pivotally secured to one end of a bell crank 43, as indicated at 44. The bell crank is fixed to the shaft 30 and is moved pivotally about the vertical axis of the shaft 30 by reciprocation of the piston rod 42. The centering guide arm 25 is also fixed to the shaft 30 and is moved pivotally about the axis of the shaft to closed position by the pivotal movement of the bell crank after the coil is moved past the arms.

A lever 45 is fixed to the shaft 30 and is adapted to move the arm 26 pivotally about the axis of its vertical shaft 30 when it is moved pivotally about said axis. A link 46 is pivotally connected at one end to an end of the bell crank 43, as indicated at 47, and at its other end to one end of the lever 45, as indicated at 48. It will be noted that the connection 47 is on one side of the pivot of the bell crank, and the connection 48 is on the opposite side of the pivot of the lever, so that the arms will pivot in opposite directions to close together.

When an article carried by the conveyor engages both switch closing plates 33, both switches 35 are opened to actuate the hydraulic cylinder 39. The hydraulic cylinder is so arranged that it releases the arms 25 and 26 for pivotal movement when the switches 35 are opened. The article being conveyed moves both arms pivotally outwardly. The mechanical linkage, comprising the link 46, lever 45, and bell crank 43 insures simultaneous, equal pivotal movement of both arms 25 and 26 in opposite rotational directions.

As soon as the free ends of the arms 25 and 26 move apart far enough to allow passage of the article carried by the conveyor, the conveyor moves said article past the barrier, and the springs 36 and the counterweights 37 move the plates 33 back to their normal position. The movement of the plates 33 back to normal position closes the switches 35 and causes the piston rod 42 to move the bell crank 43 clockwise, as viewed in FIG. 1. The bell crank acts through link 46 and lever 45 to move the arms 25 and 26 back into their closed angular position in which they are adapted to intercept articles carried by said conveyor.

The link 46 preferably comprises two sections 49 and 50 that are connected by a screw 51 that permits adjustment of the length of the link.

Although there is described herein a preferred embodiment of the invention in considerable detail, it will be understood that the description is intended to be illustrative, rather than restrictive, as many details of structure may be modified or changed without departing from the spirit or scope of the invention.

We claim:

1. In combination with a conveyor, a barrier extending across said conveyor in position to intercept articles carried by said conveyor, said barrier having portions thereof disposed in angular relation converging in the direction of movement of said conveyor, holding means normally holding said barrier in position to be engaged by an article being carried by said conveyor, and means being operable by the engagement of an article carried by said conveyor with said barrier at each of said portions thereof to release said holding means, whereby said barrier may be moved from said intercepting position by an article carried by said conveyor to permit said article to be carried past said barrier by said conveyor at a predetermined position laterally of said conveyor.

2. In combination with a conveyor, a barrier extending across said conveyor in position to intercept articles carried by said conveyor, said barrier having portions thereof disposed in angular relation converging in the direction of movement of said conveyor, holding means normally holding said barrier in position to be engaged by an article being carried by said conveyor, serially connected means in each of said portions of said barrier connected to said holding means to control the same, said holding means being releasible from holding position by the engagement of an article carried by said conveyor with said barrier at each of said portions thereof, whereby said barrier may be moved from said intercepting position by an article carried by said conveyor to permit said article to be carried past said barrier by said conveyor at a predetermined position laterally of said conveyor.

3. In combination with a conveyor, a barrier pivotally mounted for movement above said conveyor to intercept articles carried by said conveyor, means including a hydraulic cylinder for normally holding said barrier in position to be engaged by an article being carried by said conveyor, means adapted to be engaged by an article being carried by said conveyor at two spaced areas on said barrier to actuate said hydraulic cylinder to release said barrier for pivotal movement from said intercepting position, whereby said article may be carried past said barrier by said conveyor.

4. In combination with a conveyor, a barrier extending above said conveyor in position to intercept articles carried by said conveyor, two separate contact sensing means mounted on said barrier, holding means normally holding said barrier in position to be engaged by an article being carried by said conveyor, said holding means being releasible from holding position by the simultaneous engagement of said article with said contact sensing means mounted on said barrier, to permit movement of said barrier from said intercepting position, said contact sensing means being simultaneously engageable by an article carried by said conveyor only when said article is positioned in predetermined relationship to the longitudinal center of said conveyor.

5. In combination with a conveyor, a barrier having a plurality of switches mounted thereon and extending above said conveyor in position to intercept articles carried by said conveyor, holding means normally holding said barrier in position to be engaged by an article being carried by said conveyor, said holding means being operable upon the simultaneous engagement of said article with said switches to release said barrier for movement from said intercepting position, said switches being simultaneously engageable by an article carried by said conveyor only when said article is positioned in predetermined relationship to said conveyor, said barrier being shaped to cooperate with said conveyor to move any article engaged by said barrier into said predetermined relationship whenever an article carried by said conveyor engages said barrier out of said predetermined relationship.

6. In combination with a conveyor, a pair of arms mounted adjacent opposite edges of said conveyor to swing pivotally above said conveyor and having free ends disposed adjacent each other, holding means normally holding said arms closed in angular relationship to said conveyor, said arms being adapted to engage an article carried by said conveyor and to guide it toward the free ends of said arms, and a switch on each of said arms adapted to be actuated by said article to release said holding means to permit pivotal movement of said arms out of said angular relationship and to permit movement of said article past said arms.

7. In combination with a conveyor, a barrier comprising a pair of arms mounted adjacent opposite edges of a conveyor to swing pivotally above said conveyor and having free ends disposed adjacent each other, means including a hydraulic cylinder for positioning said arms relative to said conveyor to prevent an article carried by said conveyor from passing said barrier, said arms being in position to engage an article carried by said conveyor and to guide it toward the free ends of said arms, and a switch on each of said arms adapted to be actuated by said article to actuate said hydraulic cylinder to release said arms for pivotal movement outwardly, whereby said article may be moved past said barrier by said conveyor.

8. In combination with a conveyor, a barrier comprising a pair of arms mounted adjacent opposite edges of a conveyor to swing pivotally above said conveyor holding means normally holding said arms closed in angular relationship to said conveyor to prevent an article carried by said conveyor from passing said barrier, said arms being adapted to cooperate with said conveyor to move an article carried by said conveyor into longitudinal alignment relative to said conveyor, and a switch on each of said arms connected in series, both of said switches being adapted to be closed simultaneously by engagement with an article carried by said conveyor when said article is in said longitudinal alignment, said switches being jointly operable to release said holding means and permit said arms to move pivotally outwardly to permit said article to be moved past said barrier by said conveyor.

9. In combination with a conveyor, a barrier comprising a pair of arms mounted adjacent opposite edges of a conveyor to swing pivotally above said conveyor, a lever rigidly connected to each of said arms, a link interconnecting said levers whereby pivotal movement of one lever pivotally moves said arms simultaneously in opposite rotational directions, a hydraulic cylinder having a piston rod operatively connected to one of said levers, a switch mounted on each of said arms, said switches being connected in series and being jointly operable to actuate said hydraulic cylinder, said hydraulic cylinder normally holding said arms in angular position on said conveyor to intercept an article carried by said conveyor, the angularity of each of said arms causing it to cooperate with said conveyor to guide an article carried by said conveyor into engagement with both of said switches to open them, whereby said arms are moved pivotally outwardly by an article carried by said conveyor to permit said article to be moved past said barrier.

References Cited in the file of this patent
UNITED STATES PATENTS

| | | |
|---|---|---|
| 1,733,221 | Fuller | Oct. 29, 1929 |
| 2,501,961 | Paton | Mar. 28, 1950 |
| 2,771,176 | Clark | Nov. 20, 1956 |
| 2,781,119 | Talbot | Feb. 12, 1957 |